(12) United States Patent
Sandifer

(10) Patent No.: US 7,057,507 B1
(45) Date of Patent: Jun. 6, 2006

(54) FLOOD DETECTION AND ALARM SYSTEM

(76) Inventor: Robert L. Sandifer, P.O. Box 13235, Palm Desert, CA (US) 92255

( * ) Notice: Subject to any disclaimer, the term of this patent is extended or adjusted under 35 U.S.C. 154(b) by 0 days.

(21) Appl. No.: 10/609,927

(22) Filed: Jun. 30, 2003

Related U.S. Application Data

(60) Provisional application No. 60/463,142, filed on Apr. 14, 2003.

(51) Int. Cl.
*G08B 1/00* (2006.01)

(52) U.S. Cl. .................. 340/531; 340/605; 340/606; 340/616; 340/618; 73/40; 137/624.11; 137/486; 200/190

(58) Field of Classification Search ............. 340/531, 340/605, 606, 616, 618; 73/40.5 A, 542, 73/587, 40, 40.5 R; 137/624.11, 486; 200/190
See application file for complete search history.

(56) References Cited

U.S. PATENT DOCUMENTS

| | | |
|---|---|---|
| 4,180,088 A | 12/1979 | Mallett |
| 4,249,565 A | 2/1981 | Brust |
| 4,589,435 A | 5/1986 | Aldrich |
| 4,911,200 A | 3/1990 | Ben-Arie |
| 4,926,901 A | 5/1990 | Waltenburg |
| 5,004,014 A | 4/1991 | Bender |
| 5,021,619 A | 6/1991 | Hutchinson |
| 5,347,264 A | 9/1994 | Bjorkman |
| 5,377,529 A | 1/1995 | Boyd |
| 5,568,825 A * | 10/1996 | Faulk .................. 137/624.11 |
| 5,793,840 A | 8/1998 | Zhuang et al. |
| 5,920,265 A | 7/1999 | Johnson, Jr. et al. |
| 5,987,105 A * | 11/1999 | Jenkins et al. ............. 340/679 |
| 6,025,788 A * | 2/2000 | Diduck ................ 340/870.16 |
| 6,084,421 A * | 7/2000 | Swart et al. ............... 324/755 |
| 6,237,618 B1 | 5/2001 | Kushner |
| 6,317,051 B1 | 11/2001 | Cohen |
| 6,323,774 B1 | 11/2001 | Mitchell |
| 6,404,343 B1 | 6/2002 | Andou et al. |
| 6,437,692 B1 | 8/2002 | Petite et al. |
| 6,467,694 B1 * | 10/2002 | Jerome .................... 236/44 B |
| 6,489,895 B1 | 12/2002 | Apelman |
| 6,520,003 B1 | 2/2003 | Fox |
| 6,532,979 B1 | 3/2003 | Richter |
| 6,567,006 B1 * | 5/2003 | Lander et al. ............. 340/605 |
| 2002/0033759 A1 | 3/2002 | Morello |

* cited by examiner

*Primary Examiner*—Davetta W. Goins
(74) *Attorney, Agent, or Firm*—Knobbe, Martens, Olson & Bear, LLP

(57) ABSTRACT

A system for monitoring leaks in dwellings that includes a sensor which detects water flow. The system determines that a leak is occurring when water has flowed through a water line for longer than a preselected period of time. A central monitoring system receives a signal from a local system and the central monitoring system has an associated record for each dwelling to thereby allow flexible response to correct the leak.

19 Claims, 5 Drawing Sheets

140

RECORD N

=AUTHORIZE INSTRUCTIONS

—LOCATION OF KEY

—TELEPHONE # OF AUTHORIZED ACCESS

—CONTACT # OF DWELLING OWNER

FIG. 3

FLOOD DETECTION AND ALARM SYSTEM

RELATED APPLICATIONS

This application claims the benefit of U.S. Provisional Application No. 60/463,142 filed Apr. 14, 2003 which is hereby incorporated in its entirety herein.

BACKGROUND OF THE INVENTION

1. Field of the Invention

The present invention relates to a system for detecting flooding in buildings, such as homes, apartments, condominiums and offices, and, in particular, concerns a system which monitors water flow and provides a signal to a centralized alarm system such that the centralized alarm system can take corrective action without necessarily disabling the water supply.

2. Description of the Related Art

Water intrusion problems can pose very significant problems for owners of buildings. Water damage can occur in a variety of different circumstances including burst pipes, overflowing toilets and overflowing sinks. If the occupant of the building is not present when the leak occurs, a very substantial amount of water can leak into the building causing substantial damage to both the contents of the building as well as the structural components of the building.

For example, an unattended water leak that persists for several hours can result in thousands of gallons of water being deposited onto the floor, thereby ruining rugs, furniture and other contents. Moreover, the water will ultimately seep into subfloor areas and into wall spaces thereby damaging the structural components of these spaces. A further, very substantial difficulty of water leaks is that mold is a natural result of excess water in a building. Mold in houses, condominiums, offices and apartments can cause health concerns and currently many insurance companies are no longer insuring buildings that have mold problems.

The problems associated with excess water leakage is particularly exacerbated in buildings that are not continuously occupied. For example, vacation-type condominiums or townhouses are often unoccupied for days or months at a time. Hence, if water begins to leak in one of these units, the water leak may not be detected until the water has seeped into adjacent occupied units. Hence, the damage may not be localized to a single location but may actually spread to multiple units causing a substantial difficulty for the homeowner's association of the condominium. The issues associated with water damage and mold in condominiums has resulted in many insurance companies no longer writing policies for condominiums in large portions of the country.

To address these particular problems, a variety of leak detection systems have been disclosed in the past. For example, one common type of leak detector comprises an electrical circuit that is located adjacent a potential source of a water leak. The electrical circuit is completed by the presence of water, thereby resulting in a signal being sent to actuate some type of local alarm. One difficulty of this type of system is that the electrical circuit is only capable of detecting a leak in one particular location. If the leak occurs at another location, a substantial amount of water would have to flow before the sensor detects the presence of water. Alternatively, multiple sensors would have to be located throughout a building to ensure that all of the likely sources of leaks would be detected. A further difficulty of these types of localized systems is that if no one is in the building when a localized alarm is initiated, then the water may continue to flow resulting in substantial damage.

There have also been systems developed that are more centralized in their ability to detect leaks within a building. For example, U.S. Pat. No. 6,317,051 to Cohen, discloses a system which detects the presence of water flowing in a pipe and either measures the accumulated volume of water flowing or measures the time duration of the water flow. The system then determines the existence of a leak if the water volume or time duration exceeds a preselected threshold. Moreover, there are also systems, such as the system disclosed in U.S. Pat. Nos. 6,323,774, and 6,237,618, to Mitchell and Kushner, respectively, that disclose the concept of a signal being sent to a centralized monitored alarm system. However, one difficulty of these types of systems is that once a leak is determined to have been detected, generally a valve is then employed to shut off all water flow to the house. If it turns out that the leak is being detected as a result of water flow exceeding a duration or volume threshold, a false detection of a leak will result in water to the dwelling being shut off which can result in an inconvenience to the occupant of the dwelling. For example, if multiple people in the building are taking showers back-to-back, the water flow volume or duration may exceed the threshold resulting in the water to the house being shut off while someone is in the middle of a shower.

From the foregoing, it will be appreciated that there is a continuing need for an improved centralized monitoring system capable of detecting leaks and allowing for a flexible response to the detection of a leak. To this end, there is a need for a reliable system that can provide an indication of a leak and, further, that the system be able to implement one of a plurality of corrective actions in order to address the leak.

SUMMARY OF THE INVENTION

The aforementioned needs are satisfied by the leak detection system of the present invention which, in one aspect, is comprised of a plurality of water detectors that detect the flow of water through a plurality of inlet water pipes to a plurality of buildings, a plurality of local alarm devices located in the plurality of buildings each of which receive a signal indicative of the flow of water through the plurality of inlet pipes, and a centralized monitoring system located remotely from the plurality of local alarm devices. The centralized monitoring system, in one implementation, includes a plurality of records corresponding to each of the plurality of buildings wherein the records respectively define a number of corrective actions that are to be taken by the central monitoring system in response to receiving a signal indicative of a leak in the building. The monitoring system further holds open the alarm state for a particular building until it receives an indication that successful corrective action has been taken to address a water leak.

In one implementation, the system provides both a local alarm and a centrally monitored alarm which are overlapping to ensure that the problem is addressed. In yet another implementation, the system further monitors the sensor and also provides alarms to the local home owner as well as the central monitoring system indicative of a sensor failure so that corrective action can be taken to maintain the integrity of the system.

By monitoring water flow at the input to a dwelling and by having a centrally monitored system which can implement a plurality of different corrective actions, the ability of the system described herein to address water leaks in a flexible yet efficient fashion is greatly enhanced. These and other objects and advantages of the present invention will become more apparent from the following description taken in conjunction with the accompanying drawings.

BRIEF DESCRIPTION OF THE DRAWINGS

FIG. 3 is a graphical representation of an exemplary record in a central station for a particular building detailing the appropriate corrective action in response to the detection of a potential water overflow;

DETAILED DESCRIPTION OF THE PREFERRED EMBODIMENT

Figure 1:
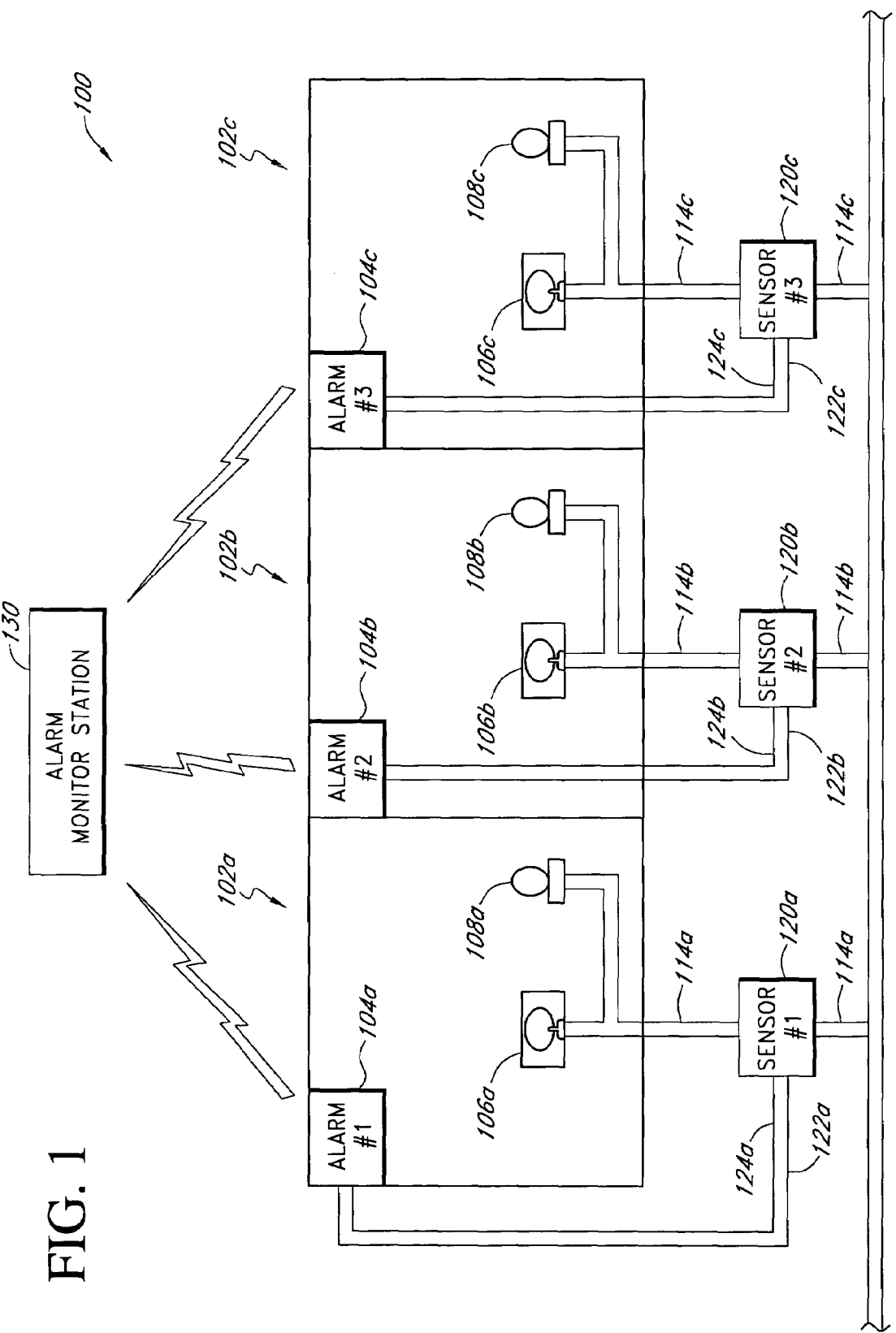
FIG. 1 is a schematic illustration of one embodiment of a water overflow monitoring system.

Reference will now be made wherein like numerals refer to like parts throughout. FIG. 1 is a schematic illustration of a water leak system 100 capable of monitoring a plurality of buildings 102a–102c to determine if a water leak has occurred in any one of these buildings. While in FIG. 1 only three buildings are shown, it will appreciated that the system can be used in conjunction with many more than three dwellings, potentially hundreds or even thousands of buildings. Moreover, the use of the term "building" in this application is meant to refer to any structure in which water is supplied including houses, condominiums, townhouses, apartment buildings, trailer parks, offices, industrial facilities and the like.

As shown in FIG. 1, water is supplied to the plurality of buildings 102a–102c from a water main 112 which is connected to a central water supply (not shown). Water supply lines 114a–114c attach to the water main 112 to thereby bring water from the water main into each of the buildings 102a–102c. As is schematically illustrated in FIG. 1, a plurality of fixtures, such as sinks 106a–106c or toilets 108a–108c are positioned within the buildings 102a–102c. When leaks occur in the buildings 102a–102c, the water damage can be very substantial particularly when the building is not occupied.

As is also schematically illustrated in FIG. 1, a plurality of sensors 120a–120c are installed on each of the water lines 114a–114c, respectively, so as to sense the flow of water through the water lines 114a–114c. Preferably, the sensors 120a–120c are installed on the water line at a location outside of the building, e.g., buried underground, so as to send the total amount of water flowing into the building. In one particular implementation, the sensors detect the presence of water flowing through the water line and provide a signal to a local alarm system 104a–104c indicative of the flow of water.

As will be described in greater detail below, the alarm panel 104a–104c comprises an alarm panel which incorporates typical household and building alarm functions such as fire detection and intrusion detection.

The alarm panels 104a–104c are modified so as to measure the amount of time that water is flowing through the water lines 114a–114c as indicated by the signal provided by the sensors 120a–120c. If the duration of the water flow exceeds a preselected threshold, then the local alarm 104a–104c will send an appropriate signal to a remote central alarm monitoring station 130. It will be appreciated that while the following description describes the sensor 120a–120c sending a signal indicative of water flow and that the alarm panel 104a–104c determines the existence of a potential leak when the water flow exceeds a particular time duration, any of a number of different measurement techniques can be used to determine the possibility of a leak without departing from the spirit of the present invention. For example, the volume of water flowing through the water lines 114a–114c can also be measured and, when the volume exceeds a preselected threshold, a leak can then be inferred.

In one particular implementation, the sensors 120a–120c comprise a Model Q-10 or a Model Q-10 VCR Fluid Flow Switch available from the Harwell Corporation of Oxnard, Calif. As is illustrated in FIG. 1, the sensors 120a–120c typically include two conductors that interconnect the sensor to the corresponding alarm panel 104a–104c. The first conductor 122a–122c provides a signal indicative of whether water is flowing in the water line 114a–114c. The second conductor 124a–124c is a monitoring circuit that provides a signal to the alarm 104a–104c indicative of whether the sensor 120a–120c has become non-operative. In this way, the alarm can detect whether water has begun to flow for an extended period of time and also is advised when the sensor 120 is no longer operating correctly.

Figure 2:
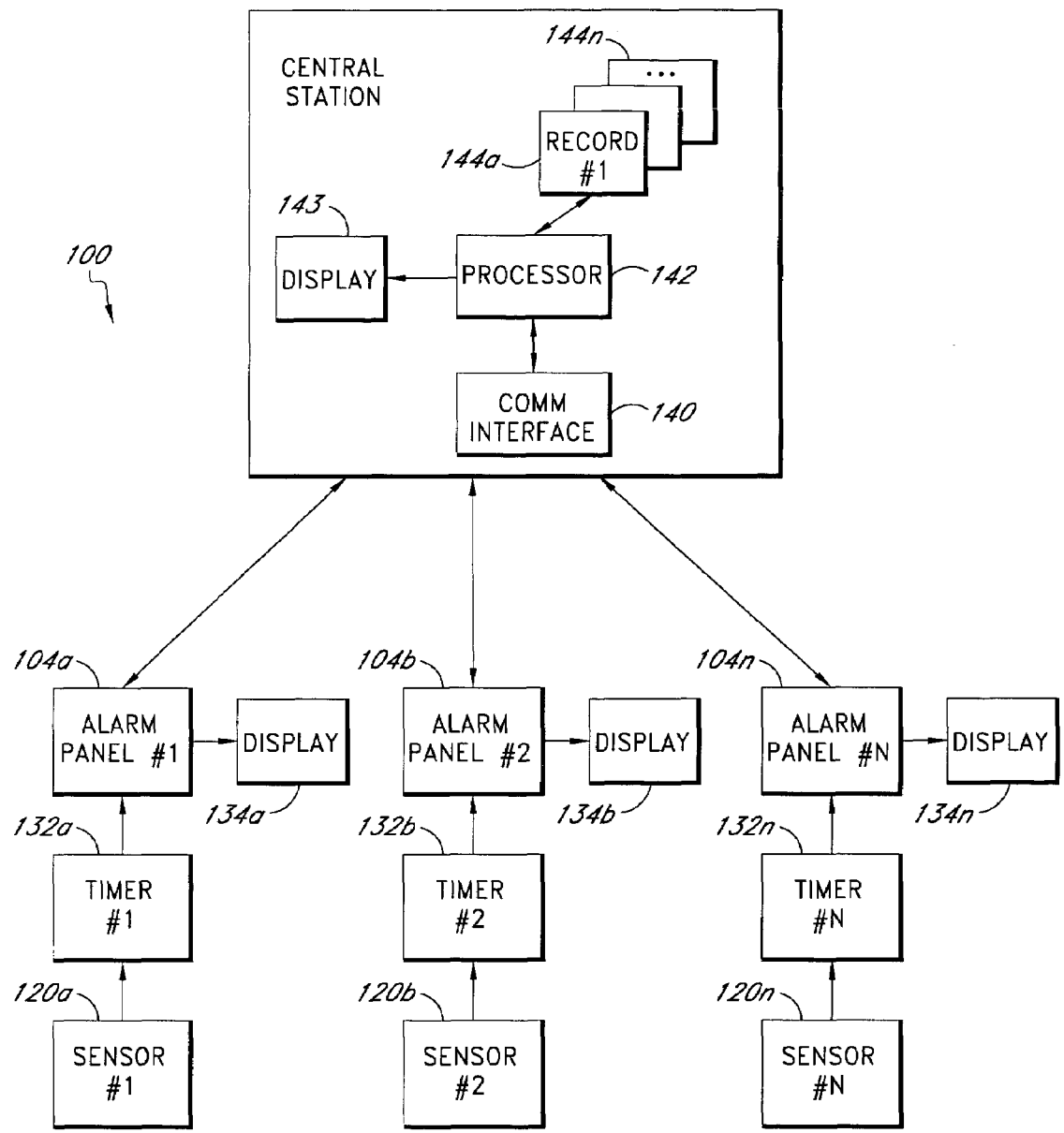
FIG. 2 is another schematic illustration of the water overflow and alarm system of FIG. 1.

FIG. 2 is a functional block diagram illustrating the logical organization of the monitoring system 100. As is illustrated in FIG. 2, when the sensors 120 detect water flow, a signal is sent to a timer 132 that then initiates a timing sequence to determine the duration of the water flow. The timer 132 can either be a discrete component or can be functionally implemented in the local alarm panel. If the duration of the water flow exceeds a preselected threshold, such as thirty minutes or one hour, a signal is then sent to the alarm panel 104 indicative of the suspected presence of the leak. In this implementation, the alarm panel 104 has an associated display 134 and the associated display 134 provides a local signal indicative of the leak. In one particular embodiment, the alarm panel 104 also has an audible annunciator that provides an audible tone to the occupants of the building indicating the presence of the leak. This allows an occupant of the building, if resident in the dwelling, to take immediate corrective action on their own accord to address the potential leak.

Simultaneously, the alarm panel 104 is also sending a signal either via telephone or an RF link to the central monitoring station 130 via a known communication interface 144. This signal is then provided to one or more processors 142 which provide an indication of the presence of the leak and the location of the leak to a display 134 such that the staff of the central monitoring system 130 is made aware of the leak such that they can take appropriate corrective action. Moreover, as is illustrated in FIG. 2, a plurality of records 144 are associated with each of the buildings 102 such that, when the processor 142 receives a leak alarm signal via the communication interface, the record 144 corresponding to the dwelling 102 is retrieved.

FIG. 3 provides an exemplary record 144 indicative of the information that is stored with respect to how to correct or address a leak alarm for a particular building. Each of the records 144a–144n is preferably customized to each building such that the response by the central station 130 can be customized to the individual needs of the occupant of the building. For example, in FIG. 3 there is a listing of authorized instructions whereby the occupant or owner of the building has authorized the central station 130 to take a preselected list of corrective action in order to address the leak. This corrective action can consist of authorizing central station personnel to access the building or allow access to the building by a plumber and the like. Alternatively, the information can also consist of telephone numbers of people who have authorized access to the building or contact numbers of the owner of the building such that either an authorized person or the owners themselves can be alerted to the existence of a leak that is occurring in the building in their absence such that they themselves can take corrective action. Since the central station 130 is preferably a well-known centralized monitoring system of a variety of alarms, a plurality of different instructions can be stored within the records 144 in the central station thereby allowing one or more of a plurality of different corrective actions to be employed in order to address a potential leak. This is in contrast to prior art systems which automatically shut off water flow which can result in water flow being denied to a particular dwelling when it is needed.

Figure 4:
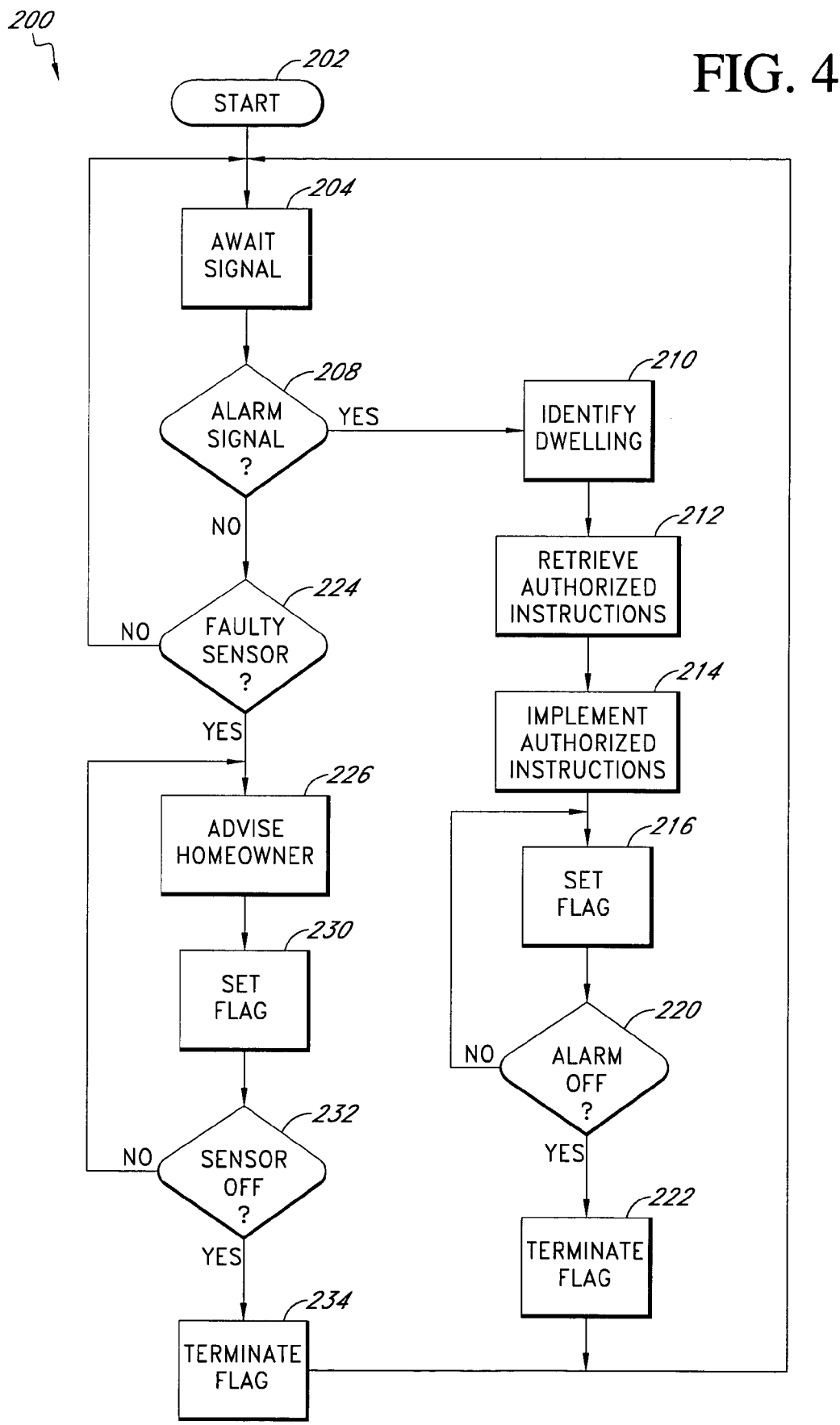
FIG. 4 is a flowchart illustrating the operation of a centralized station in responding to signals received from an alarm system in a building.

FIG. 4 is a flowchart which illustrates the operation of the central station 130 in response to receiving an alarm signal from an alarm panel 104. The processor 142 from a start state 202 enters a state 204 where it monitors the communications interface 140 for incoming signals indicative of leak alarms. In the event that the processor 142 determines, in decision state 208, that an alarm panel 104 has provided a leak alarm signal, the processor 142 then identifies the dwelling in state 210. Typically, the alarm signals that are provided by the local alarm panel 104 include header information identifying the particular panel that is sending the alarm. The processor 142 has access to memory which thereby allows the processor to determine the physical location of the alarm panel 104 that has sent the leak alarm.

Once the dwelling has been identified in state 210, the processor 142 then retrieves the authorized instruction 212 from the corresponding record 144. These instructions are then displayed on the display 134 of the central station to thereby allow implementation of the authorized instructions in state 214 by the personnel in the central station. The processor 142 further sets a flag 216 which will continuously indicate the existence of the leak alarm condition until the leak alarm has been resolved. In this way, once a particular alarm has been detected, the central monitoring station and the employees resident therein are continuously made aware of the occurrence of the alarm until the processor 142 determines, in decision state 220, that the alarm has been turned off as a result of appropriate corrective action. Once the appropriate corrective action has been taken, the processor then terminates the flag in state 222. In this way, the central monitoring system is capable of flexibly executing any of a number of corrective actions as stored in the records 144 and the individuals who monitor the status of each of the dwellings at the central monitoring station are continuously made aware of the existence of the problem until the particular problem is corrected.

The processor 142 also monitors signals from the local alarm system sensing for the existence of a faulty sensor. If the processor determines, in state 224, that a faulty sensor has been detected, the central monitoring system advises the occupant or owner of the dwelling, in state 226, and sets a flag in state 230. The homeowner or occupant can be advised of the existence of a faulty sensor either by a telephone call from the central monitoring system or some other way of contacting the owner or occupant. The central station 130 continues to either attempt to advise the owner or occupant of the problem, until it determines, in decision state 232, that corrective action to repair the sensor has been successfully undertaken at which point the central station 130 terminates the flag.

In this way, the central station 130 continuously monitors the status of the leak detection system and, when it receives an indication from the local panel 104 that the system is functioning incorrectly, efforts are made to advise the owner or occupant of the dwelling to thereby correct the system and bring it to full working order. Consequently, the central monitoring system monitors and advises owners or occupants of buildings not only of the existence of the potentially dangerous leaks, but also the occurrence of faults to the system which could result in system failure at a subsequent time. Hence, the central monitoring station 130 is capable of providing a plurality of monitoring functions and is also capable of implementing a plurality of different corrective actions in response to signals sent from the local alarm panel 104.

Figure 5:
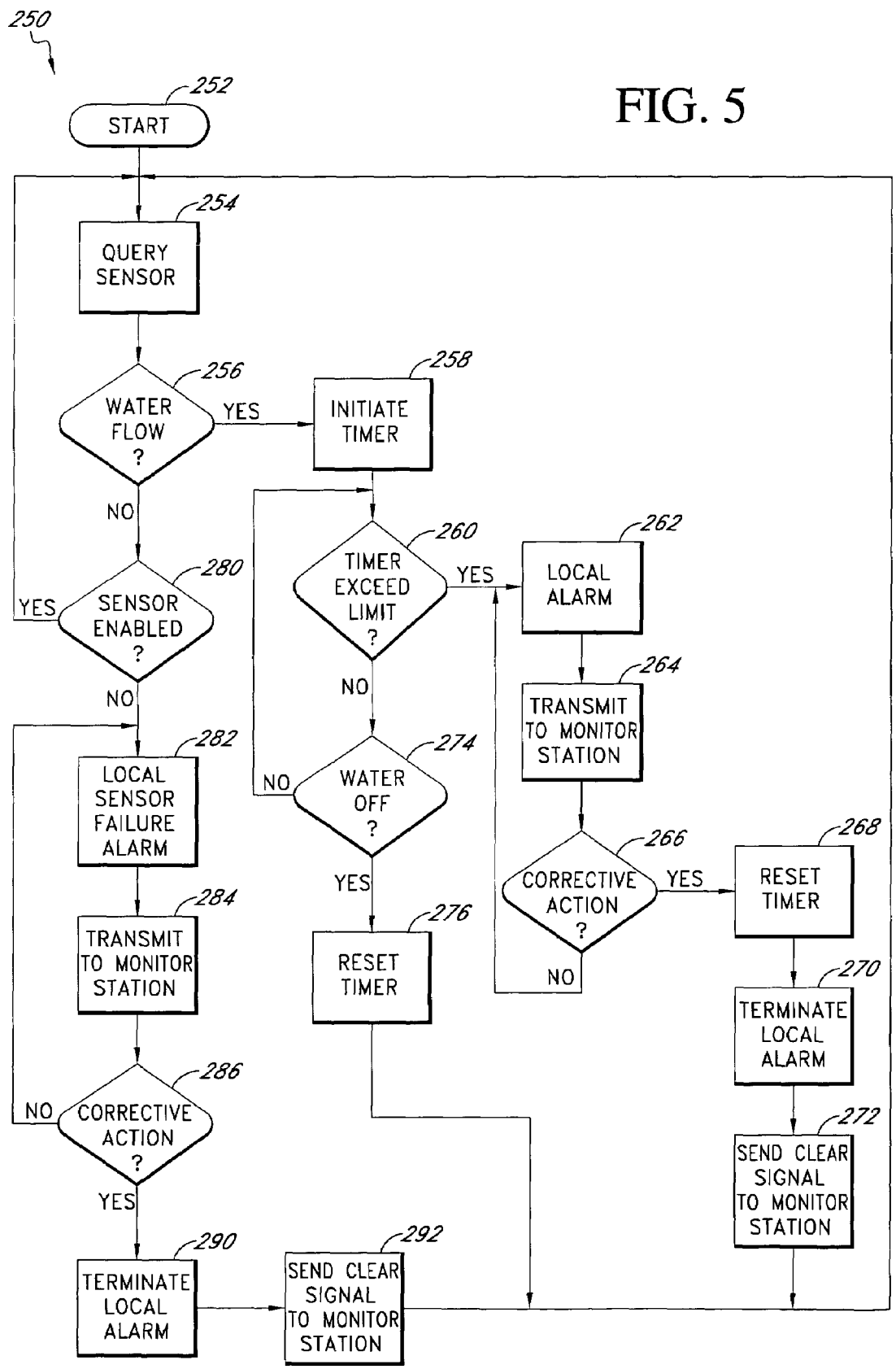
FIG. 5 is a flowchart illustrating the operation of a local alarm system within a building.

FIG. 5 is a flow chart which illustrates one exemplary method of operation of the local alarm system and associated components as it detects the occurrence of water leaks, sends signals to the central monitoring system and takes corrective action. As is illustrated in FIG. 5, the alarm panel 104, from a start state 252, queries the sensor 120, in state 254, and determines, in decision state 256, whether water is flowing. If water is determined, in decision state 256, to be flowing, the timer 132 is initiated, in state 258. As discussed above, the timer 132 is set to run while the sensor 120 indicates that water is flowing in the water line 114. The alarm panel determines, in decision state 260, whether the timer has exceeded a preselected threshold and, if it has exceeded a preselected threshold, initiates a local alarm in state 262. As discussed above, the local alarm can be a visual or audio alarm or both that is adapted to advise an individual resident in the building of the existence of a potential leak. The alarm panel 104 also transmits a leak alarm signal to the central monitoring system in state 264. The alarm panel 104 continues to annunciate the local alarm of state 262 and transmit the alarm to the central monitoring system until it determines in state 266 that corrective action has been taken. If corrective action has been taken, the alarm signal resets the timer in state 262 and terminates the local alarm in state 270 and further sends a clear signal to the monitoring station in state 272. In this way, there is the redundancy of the local alarm system signaling the occupant locally of the existence of a problem and continuously signaling the central station of the occurrence of the leak until corrective action has been taken. Generally, the determination that corrective action has been taken is indicated by the sensor 120 sensing the cessation of the water flow in the water line 114.

If the panel 104 determines, in decision state 260, that the timer has not exceeded its limit, the panel then determines, in decision state 272, whether the water flow has stopped in decision state 272. If the water flow has stopped and the timer has not exceeded the threshold, the alarm panel then resets the timer in state 276. Alternatively, if the water flow has not stopped, the alarm panel 104 continues to determine whether the timer has exceeded the threshold limit or that the water has stopped until either of these conditions occur. Hence, the local system 104 is monitoring all periods of water flow in the water line 114 to determine whether the duration of the water flow has exceeded a preselected threshold.

As is also graphically illustrated in FIG. 5, the local alarm system 104 also periodically checks to ensure that the sensor 120 is enabled in decision state 280. As is discussed above, each of the sensors includes a monitor circuit 124 to determine whether the sensor is operating correctly. In the event that the local alarm system 104 determines that a local sensor 120 is not operating correctly, the local alarm system 104 annunciates a local sensor failure alarm to thereby advise the occupant or owner of the building of the existence of the failed sensor and the potential danger that it represents. The local alarm system further sends a signal in state 284 to the central monitoring system such that the central monitoring system can redundantly monitor whether corrective action has been taken to replace or repair the sensor. The local alarm and the transmission to the monitoring station are continued until it is determined that corrective action has been taken in state 286. Typically, the determination that corrective action has been taken usually manifests itself as a correct signal coming from the monitoring circuit 124. If corrective action has been taken, the local alarm is terminated in state 290 and a clear signal is sent to the monitoring station in state 292.

As described above, the system of the illustrated embodiment both redundantly monitors at a local level and also at a central monitoring system whether a leak has occurred and continues to hold these alarms open until corrective action has been taken. Since this is a monitored system and since there is a computer record that corresponds to each dwelling, more flexible solutions to water leak problems can be employed.

Although the preceding description exemplifies one embodiment of the present invention, it should be understood that various omissions, substitutions and changes in the form of the detail of the apparatus, system and method as illustrated as well as the uses thereof, may be made by those skilled in the art without departing from the scope of the present invention. Consequently, the scope of the present invention should not be limited to the disclosed embodiments but should be defined by the appended claims.

What is claimed is:

1. A leak detection monitoring system for a plurality of buildings, the system comprising:
   a plurality of sensors respectively located in a plurality of water lines each supplying water to a building from a main water supply, wherein the plurality of sensors are positioned at the water input to the plurality of buildings and provide a signal indicative of when water is flowing in the water line;
   a plurality of local alarm systems respectively located in the plurality of buildings, wherein the plurality of local alarm systems receive the signal from an associated sensor and evaluates the signal indicative of when water is flowing in the water line to determine if water has flowed through the water line for a preselected time period that is selected to correspond to a duration of water flow that is indicative of a water leak within the building period thereby indicating that a leak condition has occurred in the building wherein the local alarm system when it determines that a water leak condition has occurred (i) provides a local alarm to alert potential occupants of the building (ii) further develops a leak alarm signal indicative of the identity of the building for transmission; and
   a central alarm system located remotely from the plurality of local alarm systems, wherein the central alarm system is in communication contact with each of the plurality of local alarm systems and wherein the central alarm system includes a memory in which records for each of the plurality of buildings wherein each of the records include site specific instructions as to how to respond to a leak and wherein the central alarm system retrieves the record for a building in response to receiving a leak alarm signal from the local alarm system associated with the building.

2. The system of claim 1, wherein the plurality of sensors provide a signal indicative of when water is flowing in the waterline.

3. The system of claim 2, wherein the plurality of local alarm systems measure the time duration of the water flow and determine that a water leak condition has occurred when the time duration of the water flow exceeds a preselected time period.

4. The system of claim 3, wherein the preselected time period is 30 continuous minutes of water flow.

5. The system of claim 1, wherein the plurality of local alarms comprise monitored home alarm systems with functionality of monitoring for fire and intrusion as well as leak detection.

6. The system of claim 5, wherein the local alarm provided by the local alarm system in response to determining that a water leak condition has occurred comprises both a visual alarm on the alarm panel and an audible alarm.

7. The system of claim 1, wherein the records in the central alarm system include:
   (i) contact information for a person who has access to the building;
   (ii) custom instructions as to how to respond to a water leak condition as provided by the owner of the building;
   (iii) contact information for the owner of the building.

8. The system of claim 1, wherein the central alarm system provides an alarm indication to one or more individuals monitoring the alarm system of the existence of the leak and wherein the central alarm system maintains the alarm indication until the central alarm system receives an indication that the condition has been corrected.

9. The system of claim 1, wherein the plurality of sensors are monitored such that the corresponding local alarm system is provided with a signal indicative of sensor failure and the central alarm system is also provided with a signal indicative of sensor failure.

10. A leak detection monitoring system for a plurality of buildings, the system comprising:
    a plurality of sensors respectively located in or adjacent a plurality of buildings at the water input to the plurality of buildings wherein the plurality of sensors provide a signal indicative of when water is flowing into the building;
    a plurality of local alarm systems respectively located in or adjacent the plurality of buildings, wherein the plurality of local alarm systems receive the signals from an associated sensor and evaluate the signal indicative of water flow by determining whether the water has flowed for a time period in excess of a threshold time period that is selected to correspond to a duration of water flow that is indicative of a water leak within the building to determine if a water leak condition has occurred in the building wherein the local alarm system, when it determines that a water leak condition has occurred, develops a leak alarm signal indicative of the identity of the building for transmission; and
    a central alarm system located remotely from the plurality of local alarm systems, wherein the central alarm system is in communication contact with each of the plurality of local alarm systems and wherein the central alarm system includes a memory in which records for each of the plurality of buildings are stored wherein each of the records include site specific instructions as to how to respond to a leak and wherein the central alarm system retrieves the record for a building in response to receiving a leak alarm signal from the local alarm system associated with the building.

11. The system of claim 10, wherein the plurality of sensors provide a signal indicative of when water is flowing in the waterline and wherein the plurality of local alarm systems measure the time duration of the water flow and determine that a water leak condition has occurred when the time duration of the water flow exceeds a preselected time period.

12. The system of claim 10, wherein the preselected time period is 30 continuous minutes of water flow.

13. The system of claim 10, wherein a local alarm is provided by the local alarm system in response to determining that a water leak condition has occurred wherein the local alarm comprises both a visual alarm on the alarm panel and an audible alarm.

14. The system of claim 10, wherein the records in the central alarm system include:
   (i) contact information for a person who has access to the building;
   (ii) custom instructions as to how to respond to a water leak condition as provided by the owner of the building;
   (iii) contact information for the owner of the building.

15. The system of claim 14, wherein the central alarm system provides an alarm indication to one or more individuals monitoring the alarm system of the existence of the leak and wherein the central alarm system maintains the alarm indication until the central alarm system receives an indication that the condition has been corrected.

16. A method of protecting buildings from water leaks, the method comprising:
   monitoring the water flow into a plurality of buildings for a condition indicative of a water leak by timing the duration of the water flow into the plurality of buildings to determine whether the duration of the water flow exceeds a preselected threshold wherein the preselected threshold is selected to correspond to a duration of water flow that is indicative of a leak condition in the building;
   sending a signal to a central monitoring system upon determining that a condition indicative of a water leak has occurred in one of the buildings;
   retrieving a record corresponding to the building upon which a water leak condition has been detected; and
   taking corrective action to correct the leak condition based upon the record.

17. The method of claim 16, wherein monitoring the water flow comprises monitoring the duration of the water flow into the plurality of buildings.

18. The method of claim 17, wherein taking corrective action to correct the leak comprises contacting a person with authorization to enter the building to allow access to a repair person.

19. The method of claim 16, further comprising continuing to broadcast an alarm to one or more individuals monitoring the central monitoring system until the water leak condition has been corrected.

* * * * *